(12) United States Patent
Binns et al.

(10) Patent No.: US 9,612,938 B2
(45) Date of Patent: Apr. 4, 2017

(54) PROVIDING STATUS OF A PROCESSING DEVICE WITH PERIODIC SYNCHRONIZATION POINT IN INSTRUCTION TRACING SYSTEM

(71) Applicant: Intel Corporation, Santa Clara, CA (US)

(72) Inventors: Frank Binns, Portland, OR (US); Matthew C. Merten, Hillsboro, OR (US); Mayank Bomb, Hillsboro, OR (US); Beeman C. Strong, Portland, OR (US); Peter Lachner, Heroldstatt (DE); Jason W. Brandt, Austin, TX (US); Itamar Kazachinsky, Netanya (IL); Ofer Levy, Atlit (IL); Md A. Rahman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 13/895,595

(22) Filed: May 16, 2013

(65) Prior Publication Data

US 2014/0344552 A1 Nov. 20, 2014

(51) Int. Cl.
  *G06F 7/38* (2006.01)
  *G06F 3/00* (2006.01)
  *G06F 11/36* (2006.01)
  *G06F 11/34* (2006.01)
  *G06F 11/30* (2006.01)

(52) U.S. Cl.
  CPC ...... *G06F 11/3636* (2013.01); *G06F 11/3024* (2013.01); *G06F 11/348* (2013.01); *G06F 11/3476* (2013.01); *G06F 11/3055* (2013.01); *G06F 2201/865* (2013.01)

(58) Field of Classification Search
  None
  See application file for complete search history.

(56) References Cited

U.S. PATENT DOCUMENTS

| 7,574,439 B2* | 8/2009 | Everhart | G06F 9/5027 |
| 2005/0160431 A1* | 7/2005 | Srivastava | G06F 11/3636 |
| | | | 719/313 |
| 2008/0082801 A1* | 4/2008 | Edgar | G06F 11/3648 |
| | | | 712/227 |
| 2008/0216091 A1* | 9/2008 | DeWitt | G06F 9/30094 |
| | | | 719/313 |
| 2009/0083715 A1* | 3/2009 | DeWitt, Jr. | G06F 11/3466 |
| | | | 717/128 |
| 2009/0113239 A1* | 4/2009 | Accapadi | G06F 9/30101 |
| | | | 714/15 |
| 2011/0314340 A1* | 12/2011 | Gilkerson | G06F 9/3808 |
| | | | 714/37 |

(Continued)

*Primary Examiner* — Hyun Nam
(74) *Attorney, Agent, or Firm* — Lowenstein Sandler LLP

(57) ABSTRACT

In accordance with embodiments disclosed herein, there is provided systems and methods for providing status of a processing device with a periodic synchronization point in an instruction tracing system. For example, the method may include generating a boundary packet based on a unique byte pattern in a packet log. The boundary packet provides a starting point for packet decode. The method may also include generating a plurality of state packets based on status information of the processor. The plurality of state packets follows the boundary packet when outputted into the packet log.

24 Claims, 13 Drawing Sheets

(56) References Cited

U.S. PATENT DOCUMENTS

| | | | |
|---|---|---|---|
| 2014/0229771 A1* | 8/2014 | Horley | G06F 11/364 714/45 |
| 2015/0006717 A1* | 1/2015 | Schmitt | G06F 9/30189 709/224 |
| 2015/0006868 A1* | 1/2015 | Wagner | G06F 11/00 712/239 |

* cited by examiner

PROVIDING STATUS OF A PROCESSING DEVICE WITH PERIODIC SYNCHRONIZATION POINT IN INSTRUCTION TRACING SYSTEM

TECHNICAL FIELD

The embodiments of the disclosure relate generally to processing devices and, more specifically, relate to providing status of a processing device with periodic synchronization point in an instruction tracing system.

BACKGROUND

An instruction tracing system (ITS) is a tracing capability, which provides a software execution control flow trace. The trace output is in the form of packets of variable sizes. In one example, an ITS architecture includes a periodic decoder synchronization packet, called a boundary packet. The boundary packet is a unique byte pattern in a packet log and hence serves as a sync point for a trace packet decoder ("decoder"). So, the decoder may scan through the packet log to find the boundary packet, at which point it is assured that the next byte after the boundary packet in the packet log is the first byte of a packet. As such, the boundary packet serves as the starting point for packet decode, which causes the decoder to align itself behind the first byte of the packet on packet boundaries before it may begin the packet decode.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
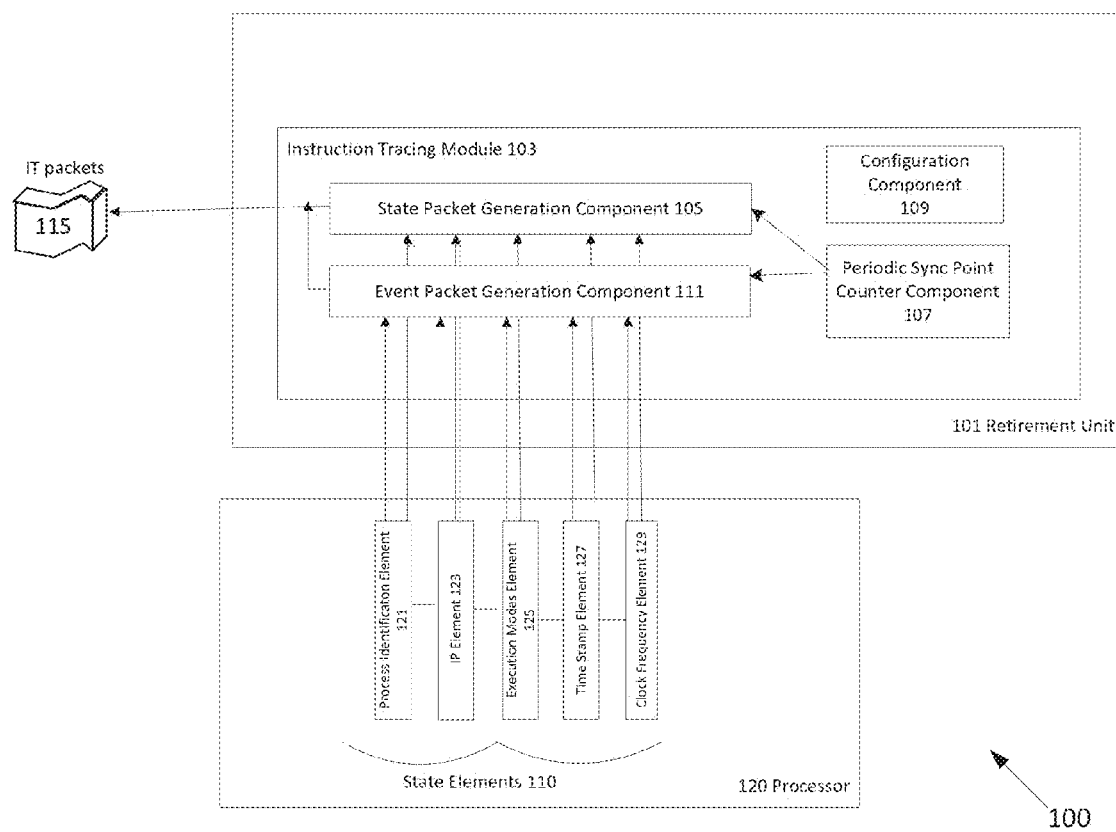
FIG. 1A illustrates an exemplary instruction tracing system (ITS) architecture of a processing device in accordance with which embodiments may operate.

Disclosed herein are embodiments for providing status of a processor with periodic synchronization point in an instruction tracing system (ITS). In one embodiment, the instruction tracing (IT) module is provided to generate the periodic synchronization point in the ITS, and the current status of a processor. In one embodiment, the current status information may be same as previous status information. In one embodiment, the current status information may include updated status information.

The IT module may leverage a periodic sync point counter component of the processor to determine when to output a unique byte pattern in a packet log. In one embodiment of the invention, the IT module may include a state packet generation component which generates boundary packets based on the unique byte pattern. The boundary packet provides a starting point for packet decode in the packet log. More specifically, the boundary packet aligns a decoder at a starting point in the packet log before it begins to decode. The state packet generation component collects the current status information of the processor. In one embodiment, the state packet generation component generates a series of state packets based on the current status information of the processor. The state packets follow the boundary packet in the packet log. More specifically, the IT module provides the current status of the processor immediately after the decoder is aligned at the starting point in the packet log.

In one embodiment of the invention, the IT module may include an event packet generation component which receives change and/or update in current status information of the processor. In one embodiment, the event packet generation component generates event packets based on the updated status information. In order to accurately decode an IT trace, a decoder needs not only be aligned in the packet boundaries to determine where to begin to decode, but also needs to know current state of the processor at the point in the trace where decode begins. The decoder needs to know which application or process is running, how to disassemble the binaries associated with that application or process, how to align the trace with other traces or event logs, etc. Previously, solutions included providing the status of a particular state element of the processor only when there is a change in the state of that particular state element of the processor. This previous solution forces the decoder to scan through the packet log ignoring most of the packets until it has seen updates to every element of state it needs. As such, without knowing the current state of the processor in the beginning of the decoding, much or all of the IT trace may be wasted as the decoder attempts to gather the processor state through the real-time updates in the packet log. As an example, the decoder cannot determine which virtual address space a particular linear address encoded in the IT trace applies to without the CR3 value, which is the pointer to the base of the page table for the process running.

In the following description, numerous specific details are set forth (for example, specific IT logic implementations, IT packet formats, hardware/firmware partitioning details, logic partitioning/integration details, processor configurations, micro-architectural details, sequences of operations, types and interrelationships of system components, and the like). However, it is understood that embodiments of the invention may be practiced without these specific details. In other instances, well-known circuits, structures and techniques have not been shown in detail in order not to obscure the understanding of this description.

FIG. 1A illustrates an exemplary architecture 100 of a processing device in accordance with which embodiments may operate including IT architecture that generates real time instruction trace (IT) packets 115. In one embodiment, the processing device is a central processing unit (CPU).

In one embodiment, the IT packets 115 include boundary packets followed by one or more state packets, which are followed by a state end packet. As discussed above, the boundary packet provides a synchronization point in an IT trace. The state packets provide current status information of a processor 120. The current status information of the processor 120 in the state packets may include information including, but not limited to, current process identification (PID), current Instruction Pointer (IP) address and current execution mode of the processor, whose functions are described below. The current status information of the processor in the state packets may also include information including, but not limited to, current timestamp, current clock frequency and any additional process identifiers (e.g. thread indication (TID) value, virtual machine control structure (VMCS) base address, etc.) whose functions are described below. In one embodiment, a page table base address (CR3) may be used as a proxy for the PID and/or TID value. The state end packet provides an indication of the end of the state packets.

In one embodiment, the IT packets 115 may also include one or more event packets. The event packets provide change and/or update in current status information of the processor as will be described in greater detail below.

More particularly, a retirement unit 101 includes an IT module 103, which receives information from the retirement unit 101 and packetizes the information to output the IT packets 115.

The IT module 103 includes a periodic sync point counter component 107 coupled to a state packet generation component (SPGC) 105, which in turn generates boundary packets in the ITS packets 115. The periodic sync point counter component 107 sends a command signal to the SPGC 105 to write the boundary, state, and state end packets to the IT output packet stream. As discussed above, the boundary packet includes this unique byte pattern in a packet log, that is, no other combination of packets can generate that particular byte pattern, and hence it serves as the sync point for a trace packet decoder ("decoder") (not shown).

As a result, the decoder may scan through the packet log to find the boundary packet, at which point it is known that the next byte after the boundary packet in the packet log is the first byte of a packet. As such, the boundary packet serves as the starting point for packet decode causing the decoder to align itself behind the first byte of the packet on packet boundaries before it may begin the packet decode.

In one embodiment, the boundary packet is generated periodically based on a number of packet output bytes, as determined by Periodic Sync Pointer Counter Component 107. The boundary packet may serve as the leading packet for a set of state packets, which provide the current status of the processor. As such, when the decoder sees the boundary packet in the packet log, the decoder interprets the packets following the boundary packet as state status packets until a state end packet is encountered. In another embodiment, the boundary packet is generated periodically based on elapsed time since the last boundary packet, as determined by the Periodic Sync Pointer Counter Component 107. In yet another embodiment, the boundary packet is generated periodically based on the filling of an internal buffer of packets or trace data, as determined by Periodic Sync Pointer Counter Component 107.

The IT module 103 includes a configuration component 109 coupled to the SPGC 105, which may allow software to configure the frequency of these periodic sync points, and may allow the software to configure the inclusion/exclusion of specific state packets in between the boundary and state end packets.

The IT module 103 of the retirement unit 101 receives current status information of the processor 120. More specifically, the state packet generation component 103 of the retirement unit 101 receives the current status information of the processor 120. In one embodiment, the current status information of the processor 120 includes a plurality of state elements 110 which send current state values to the SPGC 105. Some of the state elements 110 include at least a process ID (PID) element 121, an Instruction Pointer (IP) element 123, and execution mode element 125 to generate the current state of the processor 120. The state elements 110 may also include a timestamp element 127 and clock frequency element 129 to generate the current state of the processor 120. Although, not illustrated, other state values may be provided to generate additional status of the processor 120. For example, additional current process identifier states, such as thread indication (TID) value or virtual machine control structure (VMCS) base address, as well as memory transaction currently being executed in the processor, register states and many other state values may be provided as the current status of the processor. In one embodiment, a page table base address (CR3) may be used as a proxy for the PID and/or TID.

In one embodiment, SPGC 105 may include a combination of hardware (not shown) and microcode (not shown) to collect the status information, produce the state packets, and write them to the output stream. Specifically, upon generation of the boundary packet, the microcode is invoked to read the current state values from the state elements 110 of the processor 110 and write into the IT packets 115 as the state packets in the output stream immediately after the boundary packet. In one embodiment, the hardware in the SPGC 105 may include a storage (not shown) to temporarily store the current state values retrieved upon generation of the state packet.

In one embodiment, the PID element 121 provides a pointer to the base of the page table data structure. This data structure provides a connection between the linear (virtual) addresses used throughout the application and the actual locations in physical memory. From this, the decoder can determine what code module is associated with which linear addresses in the trace. The decoder can then finally examine the actual static code of the applications and libraries, which may be required to interpret the IT output trace. Furthermore, the CR3 value is often used as a proxy for a PID/TID in order to uniquely identify the particular application that is executing, because each process/thread typically has its own page table mapping virtual to physical addresses. In addition to simple tracking, such identifier information may be used to filter the IT output trace down to only the application of interest. However, this is imperfect because some operating systems share page tables between processes/threads, making minor but substantive changes to the structure itself when swapping processes/threads. The Instruction Pointer (IP) element 123 generates current IP address of the processor. The IP address of the processor provides the memory address of the instruction that will execute next, whether that would be in the application, libraries, operating system, etc. The IP element 123 outputs the current IP address of the processor to the SPGC 105.

The execution mode element 125 generates a current execution mode value of the processor. Such execution mode may include, but is not limited to, 8-bit mode, 16-bit mode, 32-bit mode, 48-bit mode and 64-bit mode. The execution mode is utilized for proper disassembly of the binaries in use. The execution mode element 125 outputs the current execution mode value of the processor to the SPGC 105.

The IT logic also includes a time stamp element 127. The time stamp logic may be operable to generate and provide packets to provide timing information that is useful for the IT logic. Different types of timing information are contemplated. In one embodiment, the time stamp element 127 provides a time stamp counter (TSC) value representing the official processor wall clock timer. This may represent an architectural feature and may be synchronized on multi core and even on multi socket systems sharing the same reset signal. In another, the time stamp element 127 provides a sub-sampling of such a time stamp counter value. This is referred to as a mini time stamp counter (MTC) value or packet. For example, the mini time stamp counter value may be an 8-bit sub-set of a 56-bit time stamp counter value. Such a mini time stamp counter value may allow logging information relative to the full time stamp counter value, and having the same synchronization, but in less bits. The time stamp element 127 outputs the current time stamp counter value of the processor to the SPGC 105.

The IT logic also includes clock frequency element 129. The clock frequency logic may receive a reference clock signal that is used to generate clock cycle information as the timing information. Frequency is the number of occurrences of a repeating event per unit time. The cycle information may be appended to other packets and may indicate the number of core cycles elapsed between consecutive packets. The cycle packets may be issued with core clock resolution. The clock frequency element 129 outputs the current clock frequency value of the processor to the SPGC 105, and is useful by the decoder to translate elapsed core clocks into wall clock time.

Such timing information is useful for estimating when instructions were executed. For instance, including wall-clock time allows aligning of the ITS trace with other logs, such as a log of events generated by the operating system. In the case of multiple cores, the timing information may be useful for calculating when the instructions were executed on cores with respect to other cores and with respect to wall clock time. Such timing information is also useful to allow the ITS consumer software to find and correct performance issues and/or for performance tuning. For example, the timestamp information may be used to determine what portions of code execute fast and what portions of code execute slow. When the IT modules are used, the traced program execution rate/speed is typically affected (i.e., typically reduced) as compared to if the IT logic were not used. As a result, the timing information in the packets generally does not perfectly/precisely indicate the real program execution rate/speed, but rather may serve as a useful estimate thereof.

The SPGC 105 receives the output current values from one or more of the state elements 110. In one example, the packet receives the output current values from the PID element 121, the Instruction Pointer (IP) element 123, the execution mode element 125, the time stamp counter element 127 and the clock frequency element 129. In one embodiment, the SPGC 105 extracts the current values from one or more of the state elements 110. In one embodiment, the SPGC 105 receives the current values from the one or more of the state elements 110 upon request. In one embodiment the SPGC 105 automatically receives the current values from the one or more of the state elements 110.

In one embodiment, the SPGC 105 may be constructed in hardware reading, processing, and writing packet bytes to memory all through dedicated logic. In one embodiment, the SPGC 105 may consist of microcode that executes in the processor's execution and memory units to read the state values, process the values into packets, and then write them to the ITS output channel. In another embodiment, a combination of hardware and microcode may be employed to generate the state packets. The SPGC 105 collects the output current values and converts them into state packets in IT packet format, for inclusion as state packets. In one embodiment, each of the output current values is converted into a separate state packet. The state packets are interpreted as "status only" because they do not imply any change of state at the time of the boundary packet, nor are they associated directly with any instruction or event. Hence, the state packets serve to inform the decoder the state of the processor at the time of the boundary packet.

The SPGC 105 further generates a state end packet immediately following the generation of the last state packet. As such, the state end packet functions as a terminator for the series of state packets that follow the boundary packet. When the decoder sees the state end packet in the packet log, the decoder ceases to treat the packets following the state end packet as the state packets. In one embodiment, the packets following the state end packet may include state or control flow updates, which map to specific instructions in a binary disassembly, and imply real-time updates to the state or control flow.

The IT module 102 also includes an event packet generation component (EPGC) 111, which inserts event packets into the output trace when specific state elements 110 are updated. More specifically, if there is an update in the values of one or more of the state elements 110, the updated value is outputted to the EPGC 111 which in turn converts them into event packets in the IT packet format, for inclusion as event packets and generates the event packets into the output stream. As such, when the next boundary packet is inserted sometime later (based on the periodic sync point counter component 107), the state packet generated will reflect the updated value of the state element 110. For example, if the Page Table Base Address (CR3) value is changed in the PID element 121 by the operating system software, the EPGC 111 will immediately generate an event packet inserting a mode changing packet into the output trace. So, when the next boundary packet is inserted sometime later (based on the periodic sync point counter component 107), the state packet generated for the CR3 will also reflect the new value.

In one embodiment, the state packet and the event packet for a particular state element may share the same packet format and content, and can only be distinguished by inclusion between the boundary and state end packets. As such, one or more of the output state values (i.e. content) of the state elements 110 will be the same for the state packets and the event packets. However, the event packets differ from the state packets in that they are not enclosed between a boundary and a state end packet. That is, for an event packet, all previous boundary packets are paired with state end packets in the packet log prior to the event packet. For a state packet, there will be a prior boundary packet that is not paired with an end state packet in the packet log prior to the state packet. In one embodiment, the sequence of IT packets in a packet log of the output stream may include, but not limited to, a boundary packet, which is followed by plurality of state packets, which are followed by state end packet, which is followed by a set of control flow packets, which is followed by an event packet, which is followed by another set of control flow packets. In one embodiment, such sequence repeats itself for another packet log in the output stream.

In one embodiment, the sequence of IT packets in a packet log of the output stream may include, but not limited to, a boundary packet, which is followed by plurality of state packets, which are followed by state end packet, which is followed by a set of control flow packets, which is followed by an event packet, which is followed by another set of control flow packets. In one embodiment, such sequence repeats itself for another packet log in the output stream.

Figure 1B:
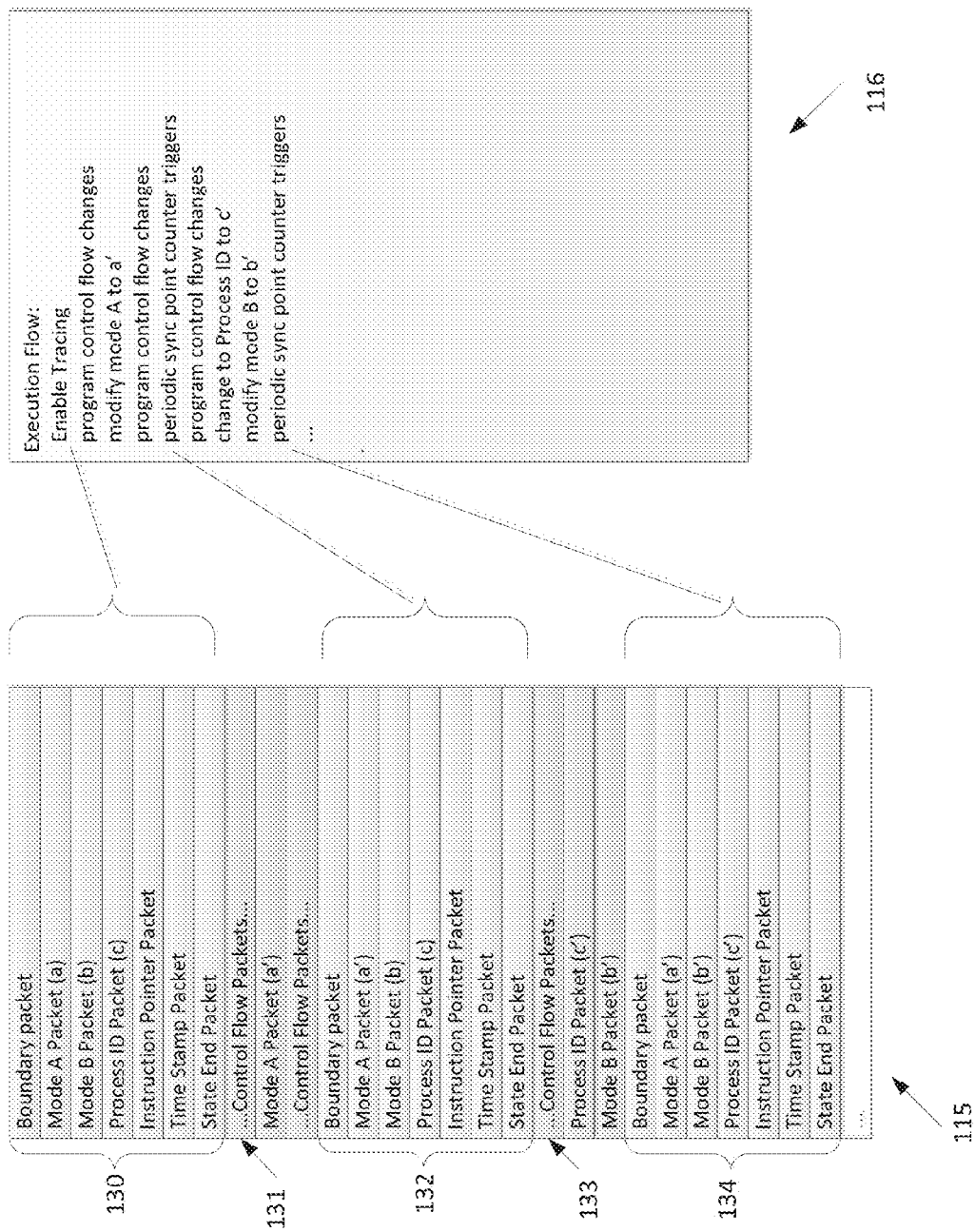
FIG. 1B illustrates examples of instruction sequence executed by the ITS and instruction tracing (IT) packets generated by the ITS.

FIG. 1B illustrates an example of the IT packets 115 generated by the IT module 103 when tracing is enabled while executing an instruction sequence 116, for example. As shown, when the tracing is enabled while executing the instruction sequence 116, a packet log of the IT packets 115 are generated by the SPGC 105, including a first set of packets 130, a number of event packets 131, a second set of packets 132, a second number of event packets 133, and a third set of packets 134. The first set of packets 130 includes a boundary packet followed by state packets, e.g. Mode A Packet (value a), Mode B packet (value b), Process ID packet (value c), Instruction Pointer Packet, and Time Stamp Packet, and a state end packet. Immediately after the state end packet, control flow event packets 131 are generated based on execution flow. In the example, in the midst of the control flow changes, Mode A changes from value a to value a' which is represented in the output packet log as an event packet, e.g. Mode A Packet (a'), which indicates that there is an update in the output value from a to a' of one field of Execution Mode Element 125. Then following, additional control flow event packets are generated. So, when the periodic sync point counter component 107 triggers the SPGC 105, the SPGC 105 writes the next set of packets 132, which includes boundary packet, state packets, and state end packet to the IT output packet stream. As such, in this next set of state packets, the Mode A packet will reflect the updated value of state A, which is a'. In a further example, the event packets 133 consist of additional control flow packets, a Process ID packet (value c') representing a change in Process ID from c to c' of the Process ID element 121, a Mode B Packet (value b') reflecting a change in Mode B which is a field of Execution Mode Element 125 from value of b to b', and finally additional control flow. So, when the periodic sync point counter component 107 triggers a second time the SPGC 105, the SPGC 105 writes the third set of packets 134 including a boundary packet, state packets, and a state end packet to the IT output packet stream. As such, in the state packets of the third set of packets 134, the Mode A retains value a', while Mode B packet value b is replaced by value b' and Process ID packet value is replaced by value c'

In one embodiment, the state packet and the event packet for a particular state element may share the same packet format, and can only be distinguished by inclusion between the boundary and end packets. As such, one or more of the output state values of the state elements 110 will be the same for the state packets and the event packets. In one embodiment, the sequence of IT packets 115 in a packet log of the output stream may include but not limited to, boundary packet, which is followed by plurality of state packets, which are followed by state end packet, which is followed by a set of event packets. In one embodiment, such sequence repeats itself for a continued packet log in the output stream.

Figure 2A:
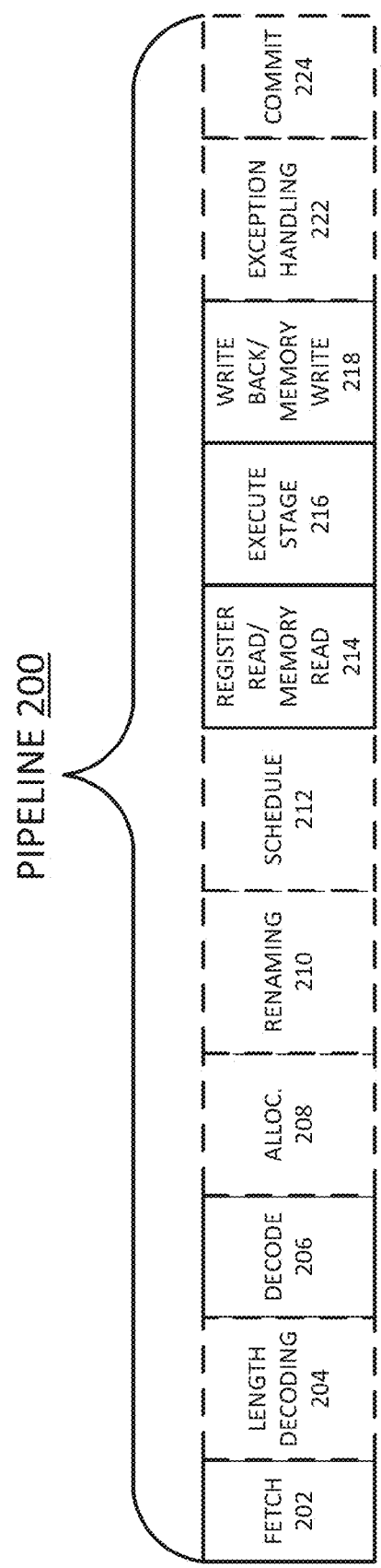
FIG. 2A is a block diagram illustrating both an exemplary in order pipeline and an exemplary register renaming, out-of-order issue/execution pipeline in accordance with described embodiments.
Figure 2B:
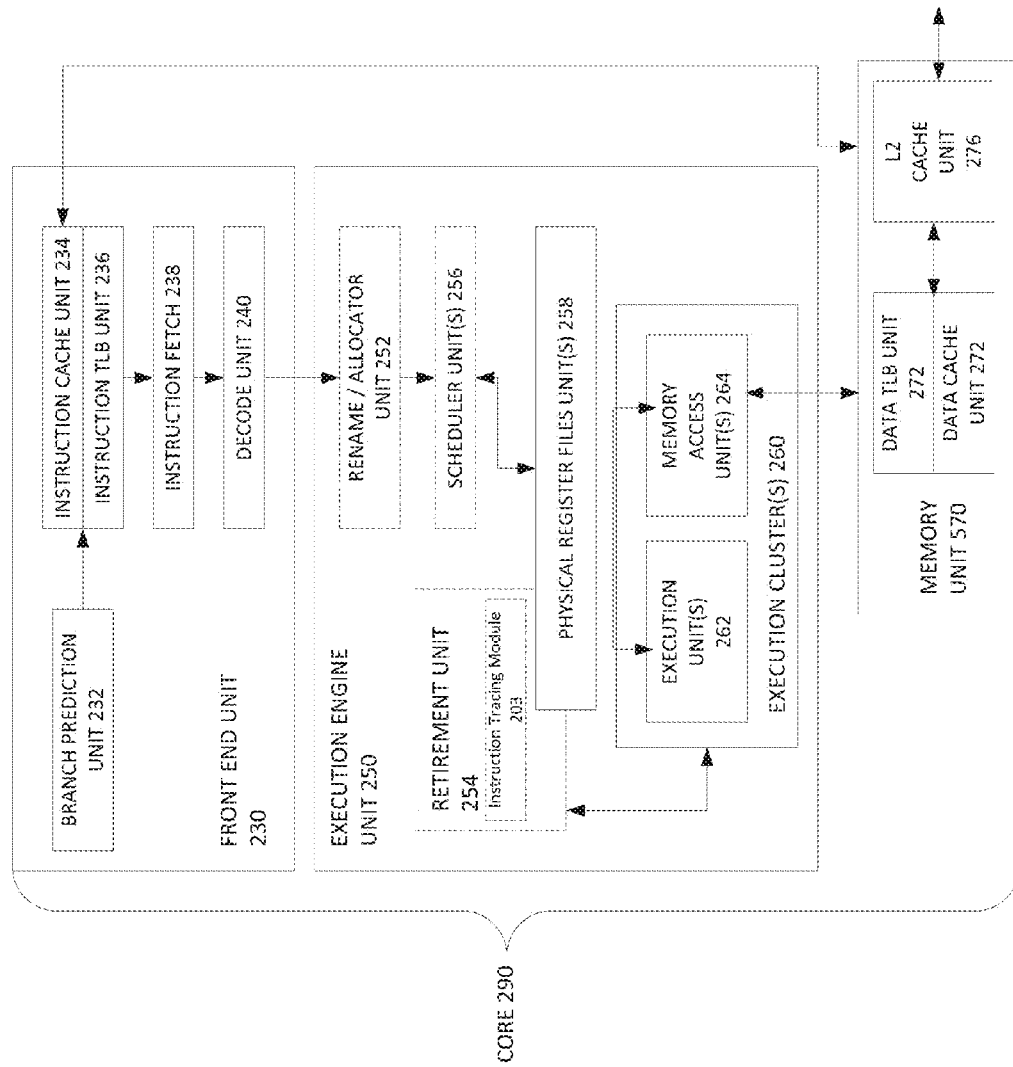
FIG. 2B is a block diagram illustrating both an exemplary embodiment of an in-order architecture core and an exemplary register renaming, out-of-order issue/execution architecture core to be included in a processor in accordance with described embodiments.

FIG. 2A is a block diagram illustrating an in-order pipeline and a register renaming stage, out-of-order issue/execution pipeline of a processor providing status of the processor with periodic synchronization point in a real time instruction trace according to at least one embodiment of the invention. FIG. 2B is a block diagram illustrating an in-order architecture core and a register renaming logic, out-of-order issue/execution logic to be included in a processor according to at least one embodiment of the invention. The solid lined boxes in FIG. 2A illustrate the in-order pipeline, while the dashed lined boxes illustrates the register renaming, out-of-order issue/execution pipeline. Similarly, the solid lined boxes in FIG. 2B illustrate the in-order architecture logic, while the dashed lined boxes illustrates the register renaming logic and out-of-order issue/execution logic.

In FIG. 2A, a processor pipeline 200 includes a fetch stage 202, a length decode stage 204, a decode stage 206, an allocation stage 208, a renaming stage 210, a scheduling (also known as a dispatch or issue) stage 212, a register read/memory read stage 214, an execute stage 216, a write back/memory write stage 218, an exception handling stage 222, and a commit stage 224. In some embodiments, the stages are provided in a different order and different stages may be considered in-order and out-of-order.

In FIG. 2B, arrows denote a coupling between two or more units and the direction of the arrow indicates a direction of data flow between those units. FIG. 2B shows processor core 290 including a front end unit 230 coupled to an execution engine unit 250, and both are coupled to a memory unit 70.

The core 290 may be a reduced instruction set computing (RISC) core, a complex instruction set computing (CISC) core, a very long instruction word (VLIW) core, or a hybrid or alternative core type. As yet another option, the core 290 may be a special-purpose core, such as, for example, a network or communication core, compression engine, graphics core, or the like.

The front end unit 230 includes a branch prediction unit 232 coupled to an instruction cache unit 234, which is coupled to an instruction translation lookaside buffer (TLB) 236, which is coupled to an instruction fetch unit 238, which is coupled to a decode unit 240. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 234 is further coupled to a level 2 (L2) cache unit 276 in the memory unit 270. The decode unit 240 is coupled to a rename/allocator unit 252 in the execution engine unit 250.

The execution engine unit 250 includes the rename/allocator unit 252 coupled to a retirement unit 254 and a set of one or more scheduler unit(s) 256. The retirement unit 254 may include real time instruction trace component 203 to generate ITS packets. The scheduler unit(s) 256 represents any number of different schedulers, including reservations stations, central instruction window, etc. The scheduler unit(s) 256 is coupled to the physical register file(s) unit(s) 258. Each of the physical register file(s) units 258 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 258 is overlapped by the retirement unit 254 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 254 and the physical register file(s) unit(s) 258 are coupled to the execution cluster(s) 460. The execution cluster(s) 260 includes a set of one or more execution units 262 and a set of one or more memory access units 264. The execution units 262 may perform various operations (e.g., shifts, addition, subtraction, multiplication) and on various types of data (e.g., scalar floating point, packed integer, packed floating point, vector integer, vector floating point).

While some embodiments may include a number of execution units dedicated to specific functions or sets of functions, other embodiments may include one execution unit or multiple execution units that all perform all functions. The scheduler unit(s) 256, physical register file(s) unit(s) 258, and execution cluster(s) 260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 264). It should also be understood that where separate pipelines are used, one or more of these pipelines may be out-of-order issue/execution and the rest in-order.

The set of memory access units 264 is coupled to the memory unit 270, which includes a data TLB unit 272 coupled to a data cache unit 274 coupled to a level 2 (L2) cache unit 276. In one exemplary embodiment, the memory access units 264 may include a load unit, a store address unit, and a store data unit, each of which is coupled to the data TLB unit 272 in the memory unit 270. The L2 cache unit 276 is coupled to one or more other levels of cache and eventually to a main memory.

By way of example, the exemplary register renaming, out-of-order issue/execution core architecture may implement the pipeline 200 as follows: 1) the instruction fetch 38 performs the fetch and length decoding stages 202 and 204; 2) the decode unit 240 performs the decode stage 206; 3) the rename/allocator unit 252 performs the allocation stage 208 and renaming stage 210; 4) the scheduler unit(s) 256 performs the schedule stage 212; 5) the physical register file(s) unit(s) 258 and the memory unit 270 perform the register read/memory read stage 214; the execution cluster 260 perform the execute stage 216; 6) the memory unit 270 and the physical register file(s) unit(s) 258 perform the write back/memory write stage 218; 7) various units may be involved in the exception handling stage 222; and 8) the retirement unit 254 and the physical register file(s) unit(s) 258 perform the commit stage 224.

The core 290 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated embodiment of the processor also includes a separate instruction and data cache units 234/274 and a shared L2 cache unit 276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 3:
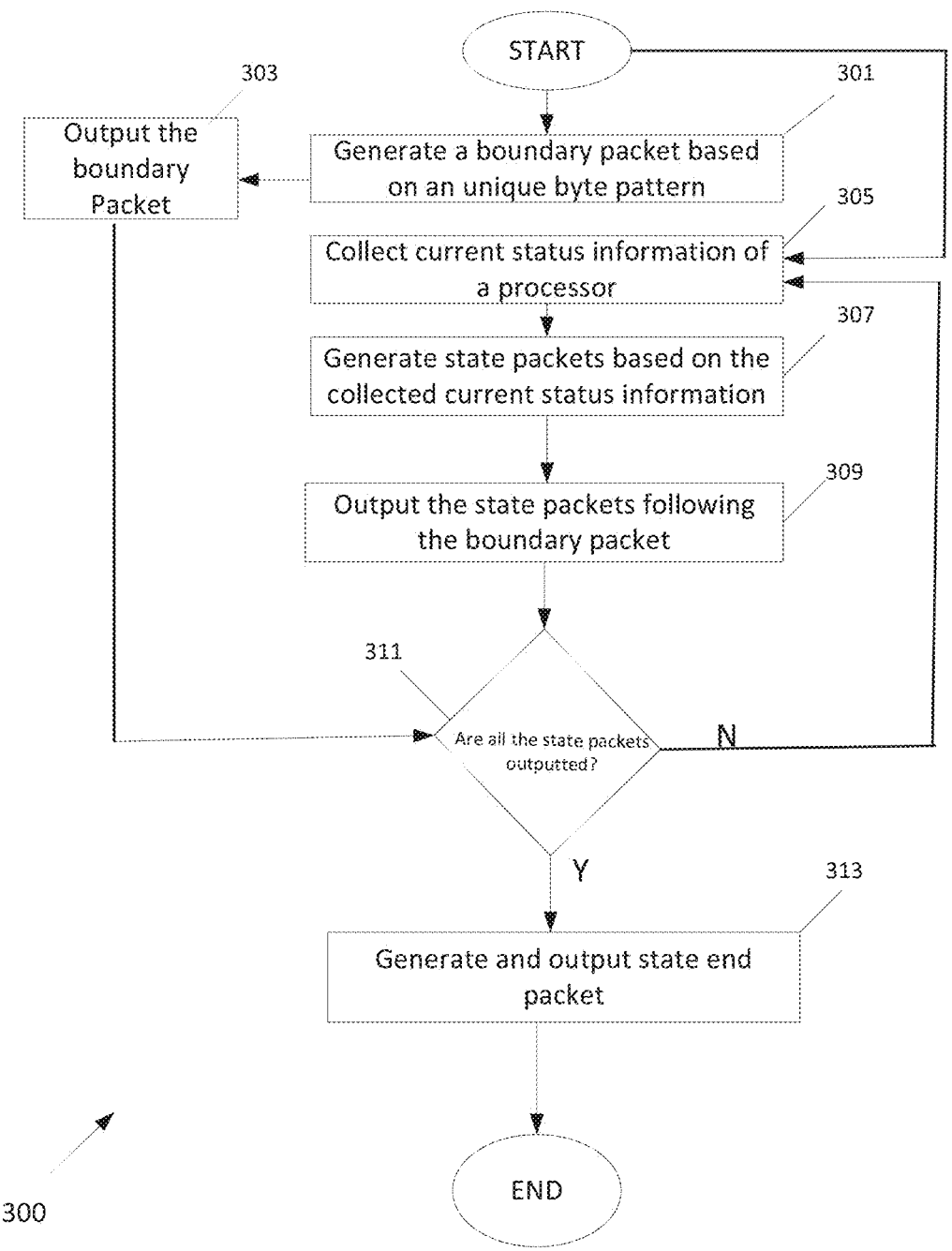
FIG. 3 is a flow diagram illustrating an example of a method for providing status of a processor along with periodic synchronization point in the ITS.

FIG. 3 is a flow diagram illustrating an example of a method 300 for providing status of a processor with a periodic synchronization point in the ITS. Method 300 may be performed by processing logic that may include hardware (e.g. circuitry, dedicated logic, programmable logic, microcode, etc.). The numbering of the blocks presented is for the sake of clarity and is not intended to prescribe an order of operations in which the various blocks may occur. In one embodiment, method 300 is performed by ITS module 103 described with respect to FIG. 1A.

Beginning with block 301, a boundary packet is generated based on a unique byte pattern in a packet log. For example, the state packet generation component (SPGC) 105 of FIG. 1A generates the boundary packet, which serves as the sync point for a trace packet decoder ("decoder"). As a result, the decoder may scan through the packet log to find the boundary packet, at which point it knows that the next byte after the boundary packet in the packet log is the first byte of a packet. As such, the boundary packet serves as the starting point for packet decode, which causes the decoder to align itself behind the first byte of the packet on packet boundaries before it may begin the packet decode. At block 303, the SPGC 105 outputs the boundary packet.

At block 305, the SPGC 105 collects current status information of the processor 120. The current status information of the processor may include current state values of the processor. In one embodiment, the current state values may be same as previous state values of the processor. In another embodiment, the current state values may be updated state values of the processor. As such, current state values of the processor are collected. Such current status information of the processor includes, but is not limited to, a current process ID (PID) value, current IP address, current execution mode, current time stamp value and current clock frequency value. For example, the PID value is generated by the PID element 121 of FIG. 1, the current IP address is generated by the IP element 123 of FIG. 1, the current execution mode is generated by the execution mode element 125 of FIG. 1, the current time stamp value is generated by the time stamp element 127 of FIG. 1A and the current clock frequency value is generated by the clock frequency 129 of FIG. 1. In one embodiment, many other values not described may be generated to provide current status of the processor. Some of these states include but not limited to the current page table base address (CR3), thread id (TID), or architectural register state.

At block 305, the SPGC 105 generates state packets based on the collected current status information of the processor. At block 309, the SPGC 105 outputs the state packets subsequent to the boundary packet. At block 311, it is determined whether all state packets have been outputted. If it is determined at block 311 that all state packets have not been outputted, block 305 is repeated. However, if it is determined at block 311 that all state packets have been outputted, then method 300 proceeds to block 313 where the SPGC 105 generates and outputs a state end packet. As discussed above, the state end packet provides an indication of the end of the series of state packets.

Figure 4:
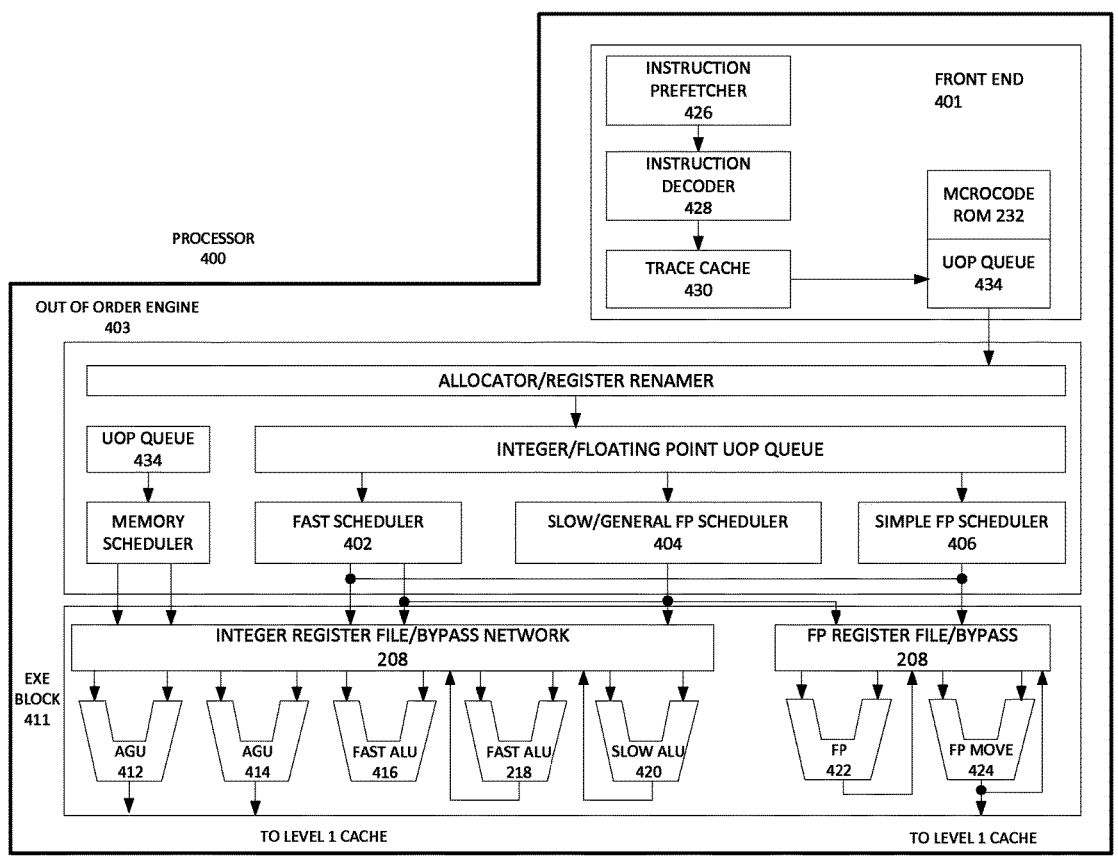
FIG. 4 is a block diagram illustrating a processor according to one embodiment.

FIG. 4 is a block diagram illustrating a micro-architecture for a processor 400 that includes logic circuits to perform instructions in accordance with one embodiment of the invention. In one embodiment, processor 400 provides real time status information of the processor with a periodic synchronization point in a real time information trace flow. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 401 is the part of the processor 400 that fetches instructions to be executed and prepares them to be used later in the processor pipeline. The front end 401 may include several units. In one embodiment, the instruction prefetcher 426 fetches instructions from memory and feeds them to an instruction decoder 428 which in turn decodes or interprets them. For example, in one embodiment, the decoder decodes a received instruction into one or more operations called "micro-instructions" or "micro-operations" (also called micro op or uops) that the machine can execute.

In other embodiments, the decoder parses the instruction into an opcode and corresponding data and control fields that are used by the micro-architecture to perform operations in accordance with one embodiment. In one embodiment, the trace cache 430 takes decoded uops and assembles them into program ordered sequences or traces in the uop queue 434 for execution. When the trace cache 430 encounters a complex instruction, the microcode ROM 432 provides the uops needed to complete the operation.

Some instructions are converted into a single micro-op, whereas others use several micro-ops to complete the full operation. In one embodiment, if more than four micro-ops are needed to complete an instruction, the decoder 428 accesses the microcode ROM 432 to do the instruction. For one embodiment, an instruction can be decoded into a small number of micro ops for processing at the instruction decoder 428. In another embodiment, an instruction can be stored within the microcode ROM 432 should a number of micro-ops be needed to accomplish the operation. The trace cache 430 refers to an entry point programmable logic array (PLA) to determine a correct micro-instruction pointer for reading the micro-code sequences to complete one or more instructions in accordance with one embodiment from the micro-code ROM 432. After the microcode ROM 432 finishes sequencing micro-ops for an instruction, the front end 401 of the machine resumes fetching micro-ops from the trace cache 430.

The out-of-order execution engine 403 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 402, slow/general floating point scheduler 404, and simple floating point scheduler 406. The uop schedulers 402, 404, 406 determine when a uop is ready to execute based on the readiness of their dependent input register operand sources and the availability of the execution resources the uops use to complete their operation. The fast scheduler 402 of one embodiment can schedule on each half of the main clock cycle while the other schedulers can schedule once per main processor clock cycle. The schedulers arbitrate for the dispatch ports to schedule uops for execution.

Register files 408, 410 sit between the schedulers 402, 404, 406, and the execution units 412, 414, 416, 418, 420, 422, 424 in the execution block 411. There is a separate register file 208, 410 for integer and floating point operations, respectively. Each register file 408, 410, of one embodiment also includes a bypass network that can bypass or forward just completed results that have not yet been written into the register file to new dependent uops. The integer register file 408 and the floating point register file 410 are also capable of communicating data with the other. For one embodiment, the integer register file 408 is split into two separate register files, one register file for the low order 32 bits of data and a second register file for the high order 32 bits of data. The floating point register file 410 of one embodiment has 128 bit wide entries because floating point instructions typically have operands from 64 to 128 bits in width.

The execution block 411 contains the execution units 412, 414, 416, 418, 420, 422, 424, where the instructions are actually executed. This section includes the register files 408, 410, that store the integer and floating point data operand values that the micro-instructions use to execute. The execution block 411 may include real time instruction trace component to generate IT packets. The processor 400 of one embodiment is comprised of a number of execution units: address generation unit (AGU) 412, AGU 414, fast ALU 416, fast ALU 418, slow ALU 420, floating point ALU 422, floating point move unit 424. For one embodiment, the floating point execution blocks 422, 424, execute floating point, MMX, SIMD, and SSE, or other operations. The floating point ALU 422 of one embodiment includes a 64 bit by 64 bit floating point divider to execute divide, square root, and remainder micro-ops. For embodiments of the invention, instructions involving a floating point value may be handled with the floating point hardware.

In one embodiment, the ALU operations go to the high-speed ALU execution units 416, 418. The fast ALUs 416, 418, of one embodiment can execute fast operations with an effective latency of half a clock cycle. For one embodiment, most complex integer operations go to the slow ALU 420 as the slow ALU 420 includes integer execution hardware for long latency type of operations, such as a multiplier, shifts, flag logic, and branch processing. Memory load/store operations are executed by the AGUs 412, 414. For one embodiment, the integer ALUs 416, 418, 420 are described in the context of performing integer operations on 64 bit data operands. In alternative embodiments, the ALUs 416, 418, 420 can be implemented to support a variety of data bits including 16, 32, 128, 256, etc. Similarly, the floating point units 422, 424 can be implemented to support a range of operands having bits of various widths. For one embodiment, the floating point units 422, 424 can operate on 128 bits wide packed data operands in conjunction with SIMD and multimedia instructions.

In one embodiment, the uops schedulers 402, 404, 406 dispatch dependent operations before the parent load has finished executing. As uops are speculatively scheduled and executed in processor 400, the processor 400 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data.

A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not differentiate between the two data types. In one embodiment, integer and floating point are either contained in the same register file or different register files. Furthermore, in one embodiment, floating point and integer data may be stored in different registers or the same registers.

Figure 5A:
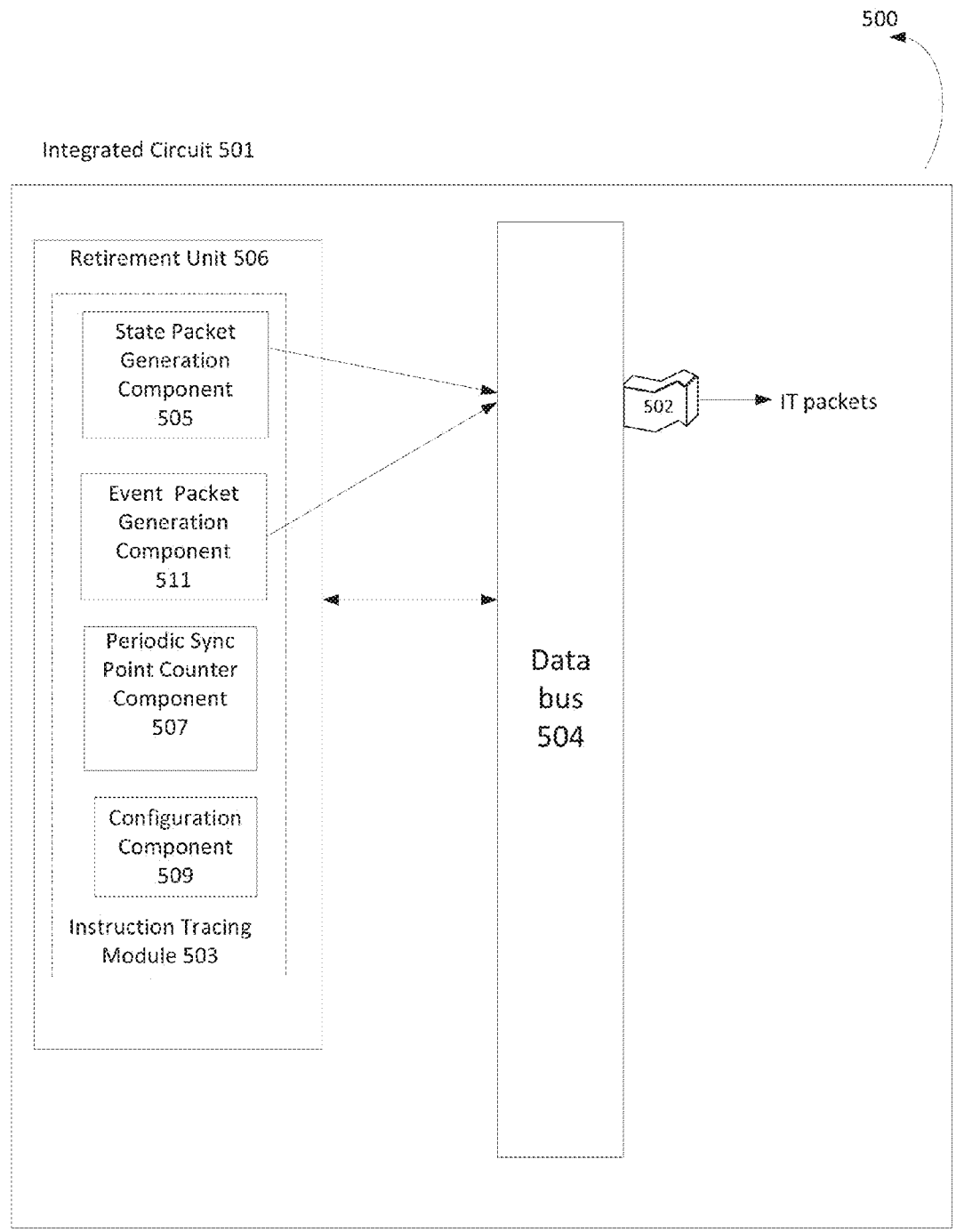
FIG. 5A illustrates an alternative exemplary architecture in accordance with which embodiments may operate.

FIG. 5A illustrates an alternative exemplary architecture in accordance with which embodiments may operate. In one embodiment, the integrated circuit 501 includes instruction tracing logic 503 to trace instructions of a traced application, mode, or code region, as the instructions are executed by the integrated circuit 501; a retirement unit 506 to provide current state of the processor The retirement unit to include a state packet generation component 503 to generate a plurality of state packets describing the traced instructions of the current state of the processor. The retirement unit 506 to also include a periodic sync point counter component 507 to generate a plurality of packets describing a beginning of the trace instructions. The retirement unit 506 to also include a configuration component 509 which allows software to configure the frequency of these periodic sync points. The retirement unit 506 to further include an event packet generation component 511 to generate a plurality of event packets describing the updates as they occur in the status of the processor. In one embodiment, the retirement unit 506 implements the instruction tracing logic 503.

In one embodiment, the retirement unit 506 includes ITS logic to implement the instruction tracing module 503. In one embodiment, the IT logic implementing the instruction tracing component 503 includes a state packet generation component 505, periodic sync point counter component 507 configuration component 509 and event packet generation component 511. In one embodiment, the state packet generation component 505 outputs packets, such as the IT packets 502 depicted on the data bus 504. In one embodiment, the event packet generation component 511 also outputs packets such as the IT packets 502 depicted on the data bus 504. In one embodiment, logic implementing the instruction tracing component 503 may be implemented in hardware. In one embodiment, logic implementing the instruction tracing component 503 may be implemented in microcode. In one embodiment, logic implementing the instruction tracing component 503 may be implemented in a combination hardware and microcode.

In one embodiment, the integrated circuit is a Central Processing Unit (CPU). In one embodiment, the central processing unit is utilized for one of a tablet computing device or a smartphone.

Figure 5B:
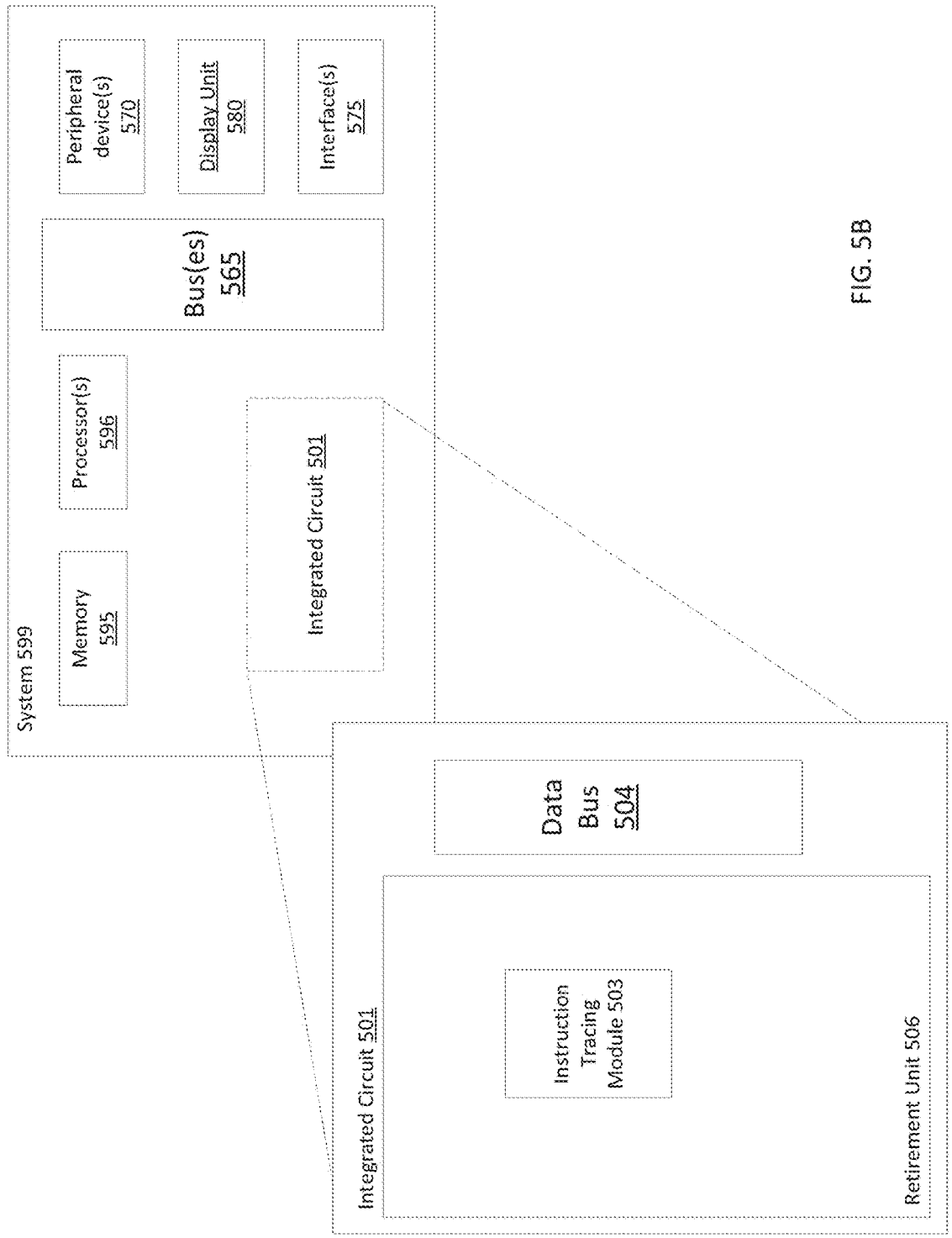
FIG. 5B shows a diagrammatic representation of a system in accordance with which embodiments may operate, be installed, integrated, or configured.

In accordance with one embodiment, such an integrated circuit 501 thus initiates instruction tracing (e.g., via instruction tracing module 503) for instructions of a traced application, mode, or code region, as the instructions are executed by the integrated circuit 501; generates a plurality of packets describing the instruction tracing (e.g., via state packet generation component 505 as controlled by the instruction tracing component 503); The plurality of packets include boundary packets generated based on a unique byte pattern in a packet log(e.g. via the periodic sync point counter component 107), followed by the state packets generated based on the current status information of the processor, which are followed by the state end packet. In one embodiment, the integrated circuit 501 generates and outputs the unique byte pattern, which is utilized to generate the boundary packet as the starting point for packet decode. In one embodiment, the integrated circuit 501 generates a plurality of event packets describing the updates in the status of the processor. In one embodiment, the integrated circuit 501 also receives current status information of the processor, which is utilized to generate and output the state packets following the boundary packet. In some embodiments, the integrated circuit 501 further determines whether all state packets have been outputted. In one embodiment, the integrated circuit 501 continues to output the state packets if more state packets are needed to be outputted. In another embodiment, the integrated circuit 501 generates the state end packet if no more state packets needed to be outputted. FIG. 5B shows a diagrammatic representation of a system 599 in accordance with which embodiments may operate, be installed, integrated, or configured.

In one embodiment, system 599 includes a memory 595 and a processor or processors 596. For example, memory 595 may store instructions to be executed and processor(s) 596 may execute such instructions. System 599 includes communication bus(es) 565 to transfer transactions, instructions, requests, and data within system 599 among a plurality of peripheral device(s) 570 communicably interfaced with one or more communication buses 565 and/or interface(s) 575. Display unit 580 is additionally depicted within system 599.

Distinct within system 599 is integrated circuit 501 which may be installed and configured in a compatible system 599, or manufactured and provided separately so as to operate in conjunction with appropriate components of system 599.

In accordance with one embodiment, system 599 includes at least a display unit 580 and an integrated circuit 501. The integrated circuit 501 may operate as, for example, a processor or as another computing component of system 599. In such an embodiment, the integrated circuit 501 of system 599 includes at least: a data bus 504, and an instruction tracing signal 503 including a state packet generation component (not shown) and event packet generation component (not shown) to generate a plurality of IT packets describing the traced instructions. In one embodiment, the IT packets include information describing a status of the processor and a synchronization point in the traced instructions.

In accordance with one embodiment, such a system 599 embodies a tablet or a smartphone, in which the display unit 580 is a touchscreen interface of the tablet or the smartphone; and further in which the integrated circuit 501 is incorporated into the tablet or smartphone.

Figure 6:
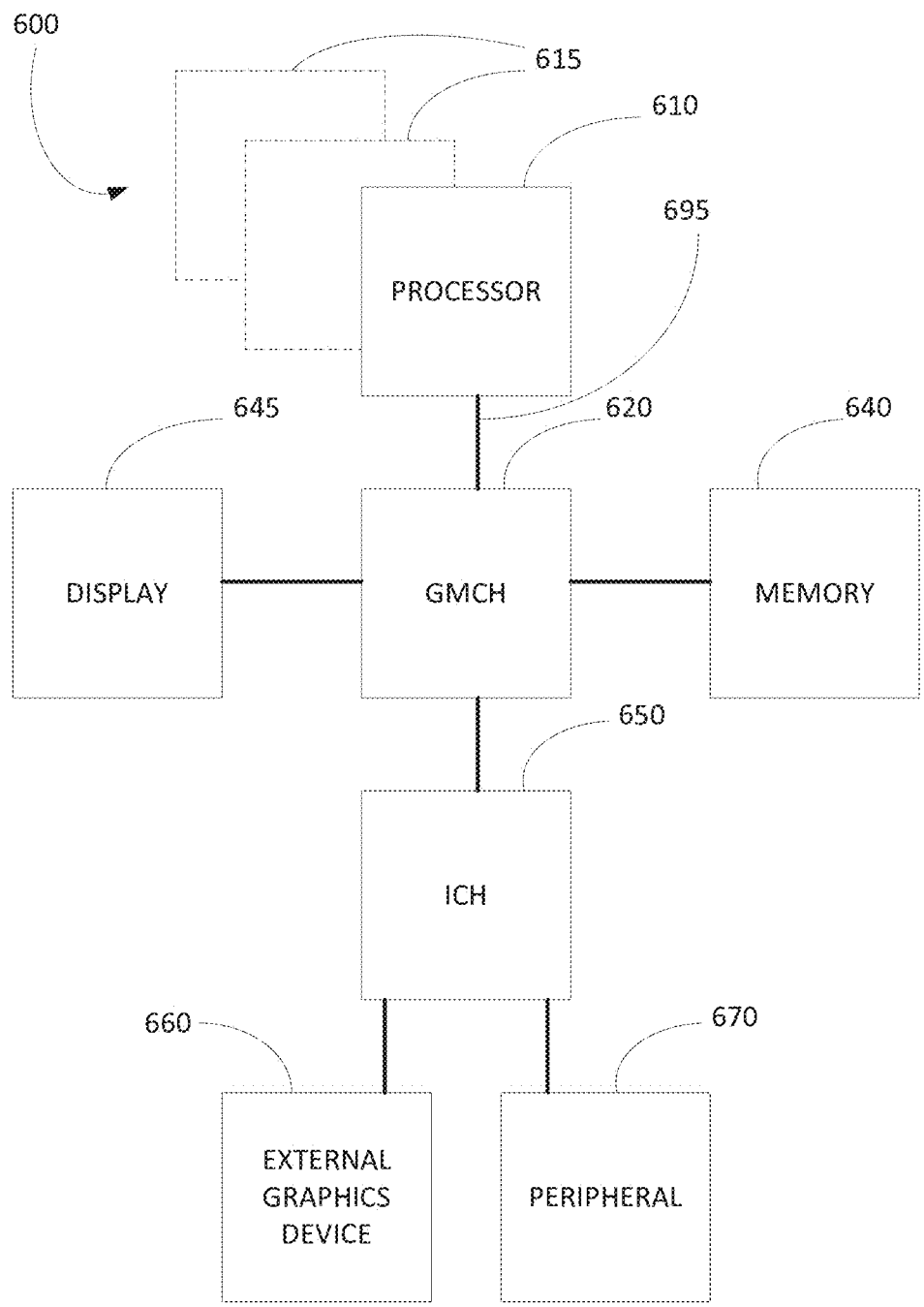
FIG. 6 illustrates a block diagram of a computer system according to one embodiment.

Referring now to FIG. 6, shown is a block diagram of a system 600 in accordance with one embodiment of the invention. The system 600 may include one or more processors 610, 615, which are coupled to graphics memory controller hub (GMCH) 620. The optional nature of additional processors 615 is denoted in FIG. 6 with broken lines. In one embodiment, processors 610, 615 provide status of the processors 610, 615 along with periodic synchronization point in an instruction trace.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
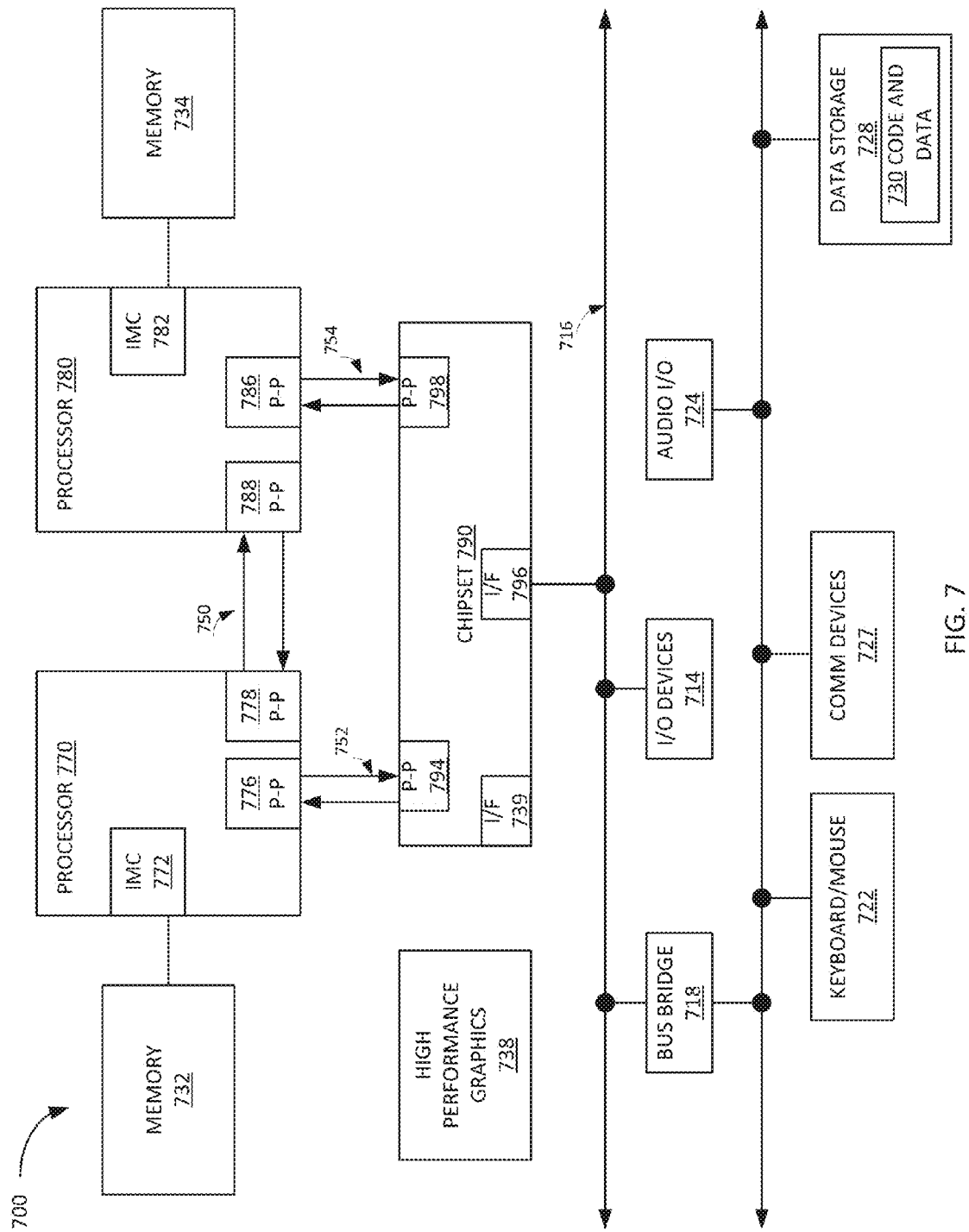
FIG. 7 illustrates a block diagram of a computer system according to one embodiment.

Referring now to FIG. 7, shown is a block diagram of a system 700 in accordance with an embodiment of the invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processors of the computing systems as described herein. In one embodiment, processors 770, 780 provide status of the processors 770, 780 along with periodic synchronization point in an instruction trace.

While shown with two processors 770, 780, it is to be understood that the scope of the disclosure is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770 and 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the disclosure is not so limited.

Figure 8:
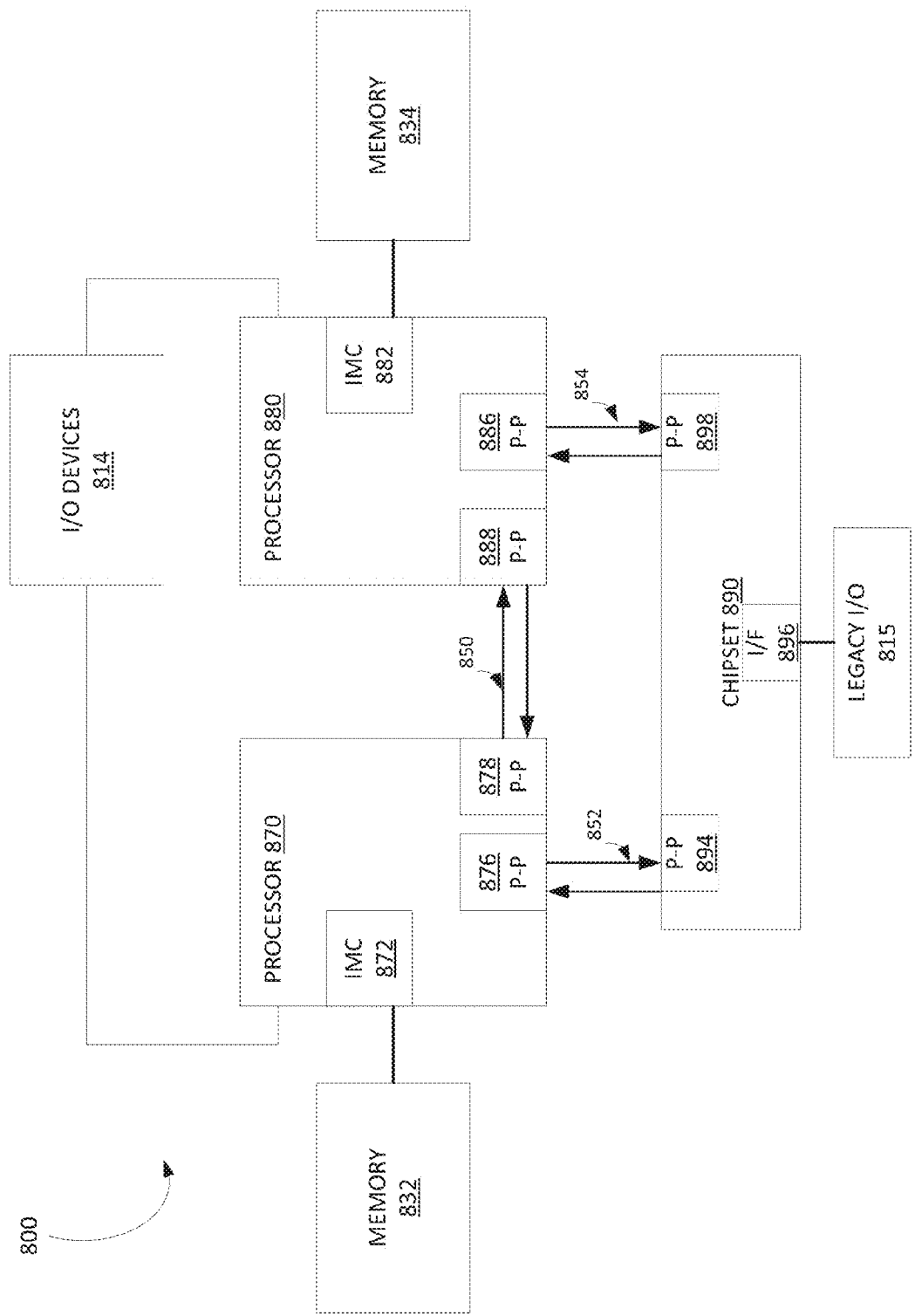
FIG. 8 illustrates a block diagram of a computer system according to one embodiment.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture. Referring now to FIG. 8, shown is a block diagram of a system 800 in accordance with an embodiment of the invention. FIG. 8 illustrates processors 870, 880. In one embodiment, processors 870, 880 provide status of the processors 870, 880 along with periodic synchronization point in an instruction trace. Furthermore, processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnect 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
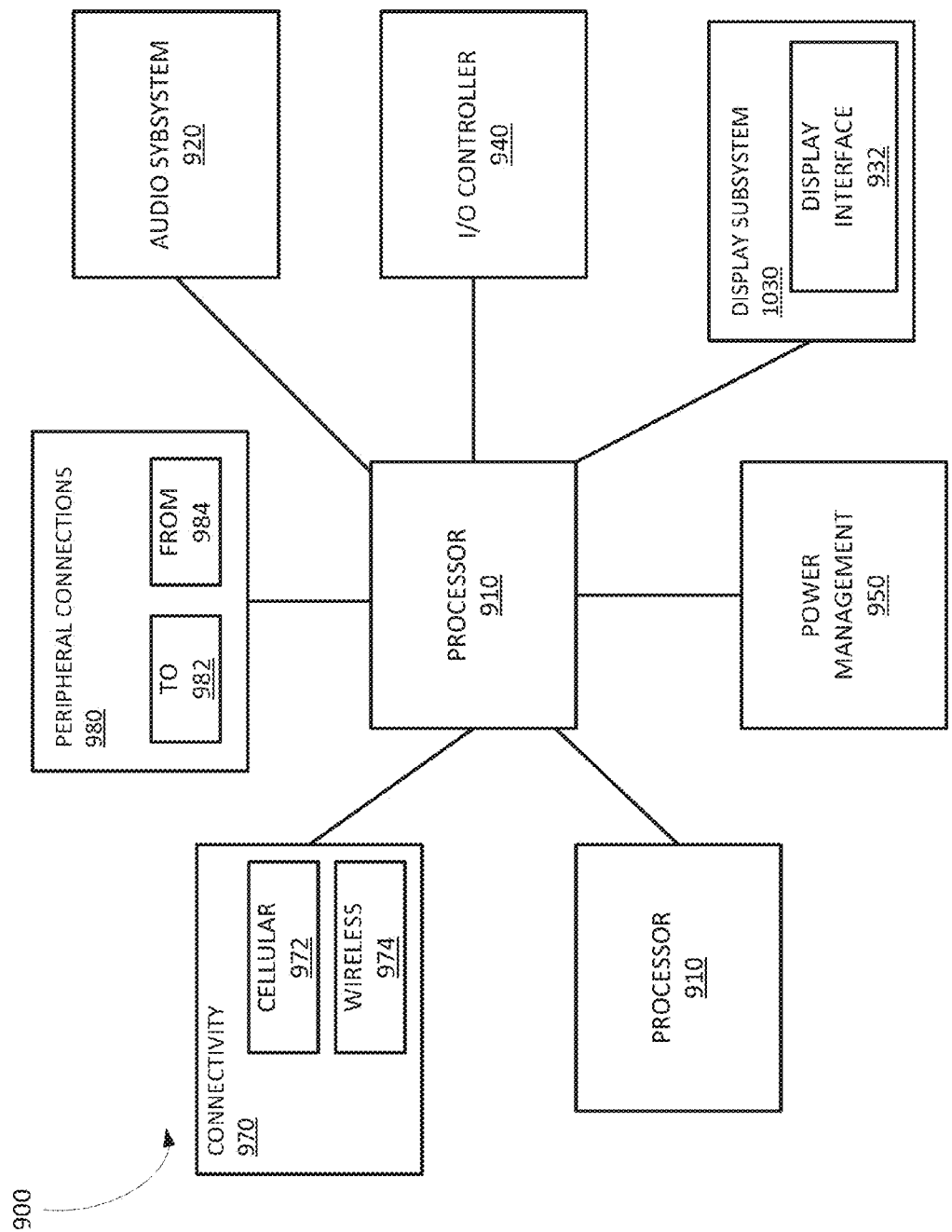
FIG. 9 illustrates block diagram of an embodiment of tablet computing device, a smartphone, or other mobile device in which touchscreen interface connectors are used.

FIG. 9 illustrates a block diagram 900 of an embodiment of tablet computing device, a smartphone, or other mobile device in which touchscreen interface connectors may be used. Processor 910 may provide status of the processor 910 along with periodic synchronization point in an instruction trace. In addition, processor 910 performs the primary processing operations. Audio subsystem 920 represents hardware (e.g., audio hardware and audio circuits) and software (e.g., drivers, codecs) components associated with providing audio functions to the computing device. In one embodiment, a user interacts with the tablet computing device or smartphone by providing audio commands that are received and processed by processor 910.

Display subsystem 930 represents hardware (e.g., display devices) and software (e.g., drivers) components that provide a visual and/or tactile display for a user to interact with the tablet computing device or smartphone. Display subsystem 930 includes display interface 932, which includes the particular screen or hardware device used to provide a display to a user. In one embodiment, display subsystem 930 includes a touchscreen device that provides both output and input to a user.

I/O controller 940 represents hardware devices and software components related to interaction with a user. I/O controller 940 can operate to manage hardware that is part of audio subsystem 920 and/or display subsystem 930. Additionally, I/O controller 940 illustrates a connection point for additional devices that connect to the tablet computing device or smartphone through which a user might interact. In one embodiment, I/O controller 940 manages devices such as accelerometers, cameras, light sensors or other environmental sensors, or other hardware that can be included in the tablet computing device or smartphone. The input can be part of direct user interaction, as well as providing environmental input to the tablet computing device or smartphone.

In one embodiment, the tablet computing device or smartphone includes power management 950 that manages battery power usage, charging of the battery, and features related to power saving operation. Memory subsystem 960 includes memory devices for storing information in the tablet computing device or smartphone. Connectivity 970 includes hardware devices (e.g., wireless and/or wired connectors and communication hardware) and software components (e.g., drivers, protocol stacks) to the tablet computing device or smartphone to communicate with external devices. Cellular connectivity 972 may include, for example, wireless carriers such as GSM (global system for mobile communications), CDMA (code division multiple access), TDM (time division multiplexing), or other cellular service standards). Wireless connectivity 974 may include, for example, activity that is not cellular, such as personal area networks (e.g., Bluetooth), local area networks (e.g., WiFi), and/or wide area networks (e.g., WiMax), or other wireless communication.

Peripheral connections 980 include hardware interfaces and connectors, as well as software components (e.g., drivers, protocol stacks) to make peripheral connections as a peripheral device ("to" 982) to other computing devices, as well as have peripheral devices ("from" 984) connected to the tablet computing device or smartphone, including, for example, a "docking" connector to connect with other computing devices. Peripheral connections 980 include common or standards-based connectors, such as a Universal Serial Bus (USB) connector, DisplayPort including MiniDisplayPort (MDP), High Definition Multimedia Interface (HDMI), Firewire, etc.

Figure 10:
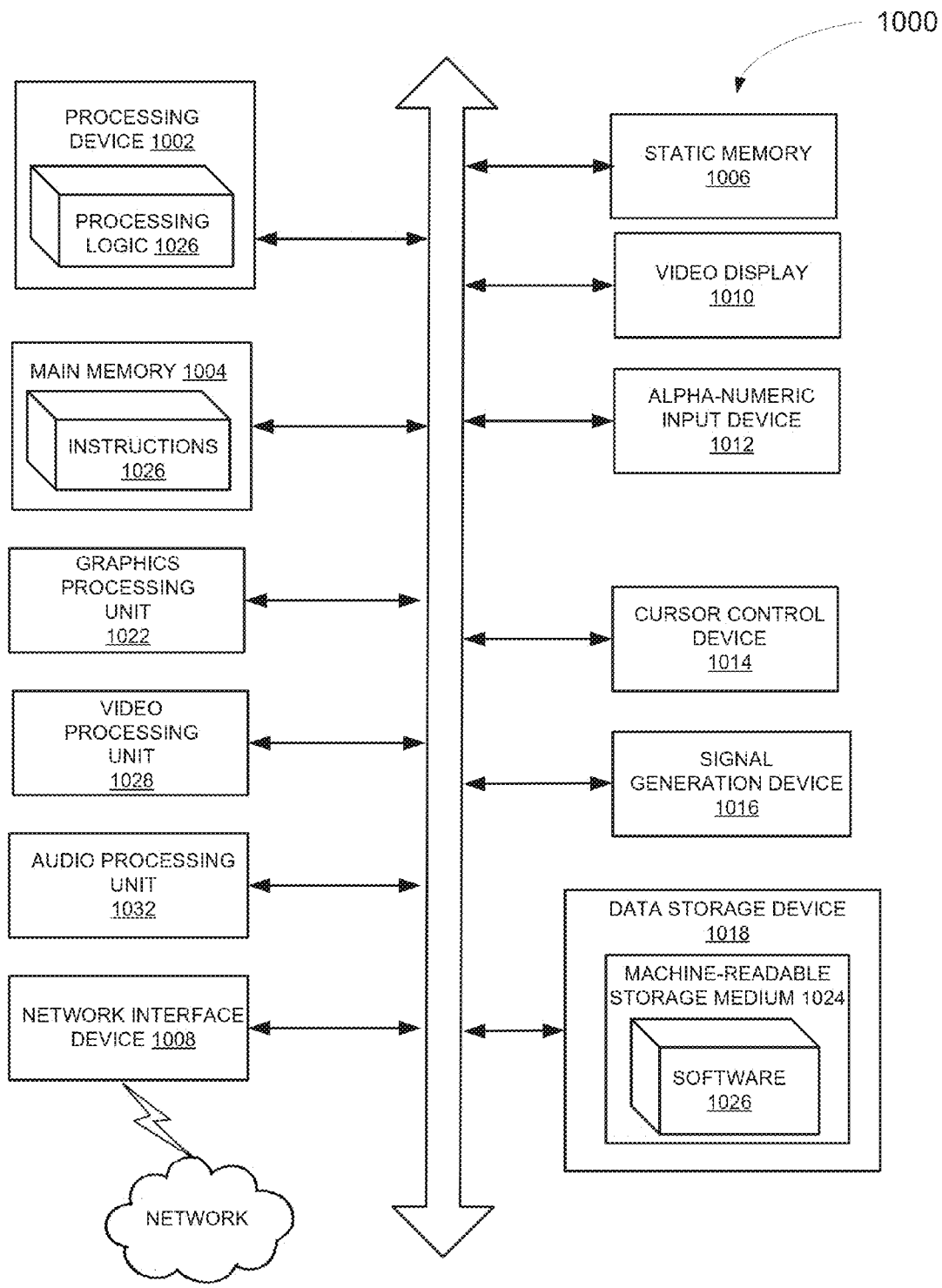
FIG. 10 illustrates a diagrammatic representation of a machine in the example form of a computer system within which a set of instructions, for causing the machine to perform any one or more of the methodologies discussed herein, may be executed.

FIG. 10 illustrates a diagrammatic representation of a machine in the example form of a computing system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computing system 1000 includes a processing device 1002, a main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In one embodiment, processing device 1002 may include one or processing cores. The processing device 1002 is configured to execute the processing logic 1026 for performing the operations discussed herein. In one embodiment, processing device 1002 is the same as processing device 100 described with respect to FIG. 1A that implements the real time instruction trace component 103 and one or more state elements 110. Alternatively, the computing system 1000 can include other components as described herein.

The computing system 1000 may further include a network interface device 1008 communicably coupled to a network 1020. The computing system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a signal generation device 1016 (e.g., a speaker), or other peripheral devices. Furthermore, computing system 1000 may include a graphics processing unit 1022, a video processing unit 1028 and an audio processing unit 1032. In another embodiment, the computing system 1000 may include a chipset (not illustrated), which refers to a group of integrated circuits, or chips, that are designed to work with the processing device 1002 and controls communications between the processing device 1002 and external devices. For example, the chipset may be a set of chips on a motherboard that links the processing device 1002 to very high-speed devices, such as main memory 1004 and graphic controllers, as well as linking the processing device 1002 to lower-speed peripheral buses of peripherals, such as USB, PCI or ISA buses.

The data storage device 1018 may include a computer-readable storage medium 1024 on which is stored software 1026 embodying any one or more of the methodologies of functions described herein. The software 1026 may also reside, completely or at least partially, within the main memory 1004 as instructions 1026 and/or within the processing device 1002 as processing logic 1026 during execution thereof by the computing system 1000; the main memory 1004 and the processing device 1002 also constituting computer-readable storage media.

The computer-readable storage medium 1024 may also be used to store instructions 1026 utilizing the real time instruction trace component 103 and one or more state elements 110, such as described with respect to FIG. 1, and/or a software library containing methods that call the above applications. While the computer-readable storage medium 1024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the embodiments. The term "computer-readable storage medium" shall accordingly be taken to include, but not be limited to, solid-state memories, and optical and magnetic media. While the invention has been described with respect to a limited number of embodiments, those skilled in the art will appreciate numerous modifications and variations therefrom. It is intended that the appended claims cover all such modifications and variations as fall within the true spirit and scope of this invention.

The following examples pertain to further embodiments. Example 1 is a processing device providing status of a processing device with periodic synchronization in an instruction tracing system comprising an instruction tracing (IT) module to generate a boundary packet based on a byte pattern in a packet log and to generate a plurality of state packets based on status information of the processing device, wherein the boundary packet provides a starting point for packet decode, the status information includes a plurality of state values, the plurality of state packets to follow the boundary packet when outputted into the packet log.

In Example 2, the subject matter of Example 1 can optionally include wherein the status information comprises current status information of the processing device, the current status information comprises one of previous status information or updated status information.

In Example 3, the subject matter of any one of Examples 1-2 can optionally include wherein the status information comprises current status information of the processing device, the current status information comprises updated status information. In Example 4, the subject matter of any one of Examples 1-3 can optionally include wherein the IT module to generate event packets based on the updated status information of the processing device, wherein the updated status information comprises updated state values.

In Example 5, the subject matter of any one of Examples 1-4 can optionally include wherein the state packets comprise at least one of the updated state values of the event packets. In Example 6, the subject matter of any one of Examples 1-5 can optionally include wherein the IT module comprises an event packet generation component (EPGC) to generate and output the event packets in the packet log. In Example 7, the subject matter of any one of Examples 1-6 can optionally include wherein the IT module comprises a state packet generation component (SPGC) to generate and output the state packets in the packet log.

In Example 8, the subject matter of any one of Examples 1-7 can optionally include wherein the IT module to determine whether additional state packets of the plurality of state packets are to be outputted into the packet log. In Example 9, the subject matter of any one of Examples 1-8 can optionally include wherein the IT module to continue the collection of the plurality of state values when it is determined that additional state packets are to be outputted into the packet log.

In Example 10, the subject matter of any one of Examples 1-9 can optionally include wherein the IT module to generate a state end packet when it is determined that the additional state packets are not to be outputted into the packet log, wherein the state end packet provides an indication of end of the state packets into the packet log. In Example 11, the subject matter of any one of Examples 1-10 can optionally include wherein packet format and content of the event packets are same as the packet format and the content of the state packets for a specific state element, wherein the event packets are not associated with the boundary packet and the state end packet.

Example 12 is a system providing status of a processing device with periodic synchronization in an instruction tracing system. In Example 12, the system includes a memory and a processing device communicably coupled to the memory, the processing device comprising a data bus and an instruction tracing (IT) module communicably coupled to the data bus. Further to Example 12, the IT module to generate a boundary packet based on a byte pattern in a packet log and generate a plurality of state packets based on status information of the processing device, wherein the boundary packet provides a starting point for packet decode wherein the status information comprise a plurality of state values, wherein the plurality of state packets to follow the boundary packet when outputted into the packet log.

In Example 13, the subject matter of Example 12 can optionally include wherein the system embodies a tablet or a smartphone, wherein the display unit comprises a touch-screen interface of the tablet or the smartphone, and wherein the processing device is incorporated into the tablet or smartphone.

Example 14 is a method for providing status of a processing device with periodic synchronization in an instruction tracing system comprising generating boundary packet based on a byte pattern in a packet log and generating a plurality of state packets based on the status information of the processor, wherein the boundary packet provides a starting point for packet decode, wherein the status information comprises a plurality of state values, wherein the plurality of the state packets follow the boundary packet when outputted into the packet log.

In Example 15, the subject matter of Example 14 can optionally include wherein the status information comprises current status information of the processing device, the current status information comprises one of previous status information or updated status information.

In Example 16, the subject matter of any one of Examples 14-15 can optionally include wherein the status information comprises current status information of the processing device, the current status information comprises updated status information. In Example 17, the subject matter of any one of Examples 1-16 can optionally include further comprising generating event packets based on the updated status information of the processing device, wherein the updated status information comprises updated state values. In Example 18, the subject matter of any one of Examples 1-17 can optionally include wherein the state packets comprise at least one of the updated state values of the event packets.

In Example 19, the subject matter of any one of Examples 1-18 can optionally determining whether additional state packets of the plurality of state packets are to be outputted into the packet log. In Example 20, the subject matter of any one of Examples 1-19 can optionally include continuing the collection of the plurality of state values when it is determined that additional state packets are to be outputted into the packet log. In Example 21, the subject matter of any one of Examples 1-20 can optionally include generating a state end packet when it is determined that the additional state packets are not to be outputted into the packet log, wherein the state end packet provides an indication of end of the state packets into the packet log.

In Example 22, the subject matter of any one of Examples 1-21 can optionally include wherein packet format and content of the event packets are same as the packet format and the content of the state packets for a specific state element, wherein the event packets are not associated with the boundary packet and the state end packet.

Example 23 is non-transitory computer-readable medium for providing status of a processing device with periodic synchronization in an instruction tracing system. In Example 23, the non-transitory machine-readable medium includes data that, when accessed by a processing device, cause the processing device to perform operations comprising generating boundary packet based on a byte pattern in a packet log and generating a plurality of state packets based on the status information of the processor, wherein the boundary packet provides a starting point for packet decode, wherein the status information comprises a plurality of state values, wherein the plurality of the state packets follow the boundary packet when outputted into the packet log.

In Example 24, the subject matter of Example 23 can optionally include wherein the status information comprises current status information of the processing device, the current status information comprises one of previous status information or updated status information.

In Example 25, the subject matter of any one of Examples 23-24 can optionally include wherein the status information comprises current status information of the processing device, the current status information comprises updated status information. In Example 26, the subject matter of any one of Examples 23-25 can optionally include wherein the operations further comprising generating event packets based on the updated status information of the processing device, wherein the updated status information comprises updated state values. In Example 27, the subject matter of any one of Examples 23-26 can optionally include wherein the state packets comprise at least one of the updated state values of the event packets.

In Example 28, the subject matter of any one of Examples 23-27 can optionally include wherein the operations further comprising determining whether additional state packets of the plurality of state packets are to be outputted into the packet log. In Example 29, the subject matter of any one of Examples 23-28 can optionally include wherein the operations further comprising continuing the collection of the plurality of state values when it is determined that additional state packets are to be outputted into the packet log. In Example 30, the subject matter of any one of Examples 23-29 can optionally include wherein the operations further comprising generating a state end packet when it is determined that the additional state packets are not to be outputted into the packet log, wherein the state end packet provides an indication of end of the state packets into the packet log.

In Example 31, the subject matter of any one of Examples 1-30 can optionally include wherein packet format and content of the event packets are same as the packet format and the content of the state packets for a specific state element, wherein the event packets are not associated with the boundary packet and the state end packet.

Example 32 is an apparatus for providing status of a processing device with periodic synchronization in an instruction tracing system comprising means for generating boundary packet based on a byte pattern in a packet log and means for generating a plurality of state packets based on the status information of the processor, wherein the boundary packet provides a starting point for packet decode, wherein the status information comprises a plurality of state values, wherein the plurality of the state packets follow the boundary packet when outputted into the packet log. In Example 33, the subject matter of Example 32 can optionally include the apparatus further configured to perform the method of any one of the Examples 15 to 22.

Example 34 is at least one machine readable medium comprising a plurality of instructions that in response to being executed on a computing device, cause the computing device to carry out a method according to any one of Examples 14-22. Example 35 is an apparatus for providing status of a processing device with periodic synchronization in an instruction tracing system to perform the method of any one of Examples 14-22. Example 36 is an apparatus for providing status of a processing device with periodic synchronization in an instruction tracing system comprising means for performing the method of any one of Examples 14-22. Specifics in the Examples may be used anywhere in one or more embodiments.

Various embodiments may have different combinations of the structural features described above. For instance, all optional features of the SOC described above may also be implemented with respect to a processor described herein and specifics in the examples may be used anywhere in one or more embodiments.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:
1. A processing device comprising:
   an instruction tracing (IT) module to:
      generate a boundary packet based on a byte pattern in a packet log, wherein the boundary packet provides a starting point for packet decode; and
      generate a plurality of state packets based on a status information of the processing device, wherein the status information comprises a plurality of state values that each provide a performance setting of the processing device, and wherein the plurality of state packets to follow the boundary packet at a time the boundary packet is outputted into the packet log.
2. The processing device of claim 1, wherein the status information comprises current status information of the processing device, the current status information comprises one of previous status information or updated status information.
3. The processing device of claim 2, wherein the IT module to generate event packets based on the updated status information of the processing device, wherein the updated status information comprises updated state values.
4. The processing device of claim 3 wherein the state packets comprise at least one of the updated state values of the event packets.
5. The processing device of claim 1, wherein the IT module to determine whether additional state packets of the plurality of state packets are to be outputted into the packet log.
6. The processing device of claim 5, wherein the IT module to continue the collection of the plurality of state values in response to determining that additional state packets are to be outputted into the packet log.
7. The processing device of claim 5, wherein the IT module to generate a state end packet in response to determining that the additional state packets are not to be outputted into the packet log, wherein the state end packet provides an indication of end of the state packets into the packet log.
8. The processing device of claim 7 wherein packet format and content of the event packets are same as the packet format and the content of the state packets for a specific state element, wherein the event packets are not associated with the boundary packet and the state end packet.
9. A method of a processing device comprising:
   generating a boundary packet based on a byte pattern in a packet log, wherein the boundary packet to provide a starting point for packet decode; and
   generating a plurality of state packets based on status information of the processing device, wherein the status information comprises a plurality of state values that each provide a performance setting of the processing device, and wherein the plurality of the state packets follow the boundary packet at a time the boundary packet is outputted into the packet log.
10. The method of claim 9 wherein the status information comprises current status information of the processing device, the current status information comprises one of previous status information or updated status information.
11. The method of claim 10 further comprising generating event packets based on the updated status information of the processing device, wherein the updated status information comprises updated state values.
12. The method of claim 11, wherein the state packets comprise at least one of the updated state values of the event packets.
13. The method of claim 9 further comprising determining whether additional state packets of the plurality of state packets are to be outputted into the packet log.
14. The method of claim 13 further comprising continuing the collecting of the plurality of state values in response to determining that additional state packets are to be outputted into the packet log.
15. The method of claim 13 further comprising generating a state end packet in response to determining that the additional state packets are not to be outputted into the packet log, wherein the state end packet provides an indication of end of the state packets in the packet log.
16. The method of claim 15 wherein packet format and content of the event packets are same as the packet format and the content of the state packets for a specific state element, wherein the event packets are not associated with the boundary packet and the state end packet.

17. A non-transitory machine-readable storage medium including data that, when accessed by a processing device, cause the processing device to perform operations comprising:
generating a boundary packet based on a byte pattern in the packet log, wherein the boundary packet to provide a starting point for packet decode; and
generating a plurality of state packets based on status information of the processing device, wherein the status information comprises a plurality of state values, that each provide a performance setting of the processing device, and wherein the plurality of the state packets follow the boundary packet in the packet log.

18. The non-transitory machine-readable storage medium of claim 17, wherein the status information comprises current status information of the processing device, the current status information comprises one of previous status information or updated status information.

19. The non-transitory machine-readable storage medium of claim 18, wherein the operations further comprising generating event packets based on the updated status information of the processing device, wherein the updated status information comprises updated state values.

20. The non-transitory machine-readable storage medium of claim 19, wherein the state packets comprise at least one of the updated state values of the event packets.

21. The non-transitory machine-readable storage medium of claim 17, wherein the operations further comprising determining whether additional state packets of the plurality of state packets are to be outputted into the packet log.

22. The non-transitory machine-readable storage medium of claim 21, wherein the operations further comprising continue the collecting of the plurality of state values in response to determining that additional state packets are to be outputted into the packet log.

23. The non-transitory machine-readable storage medium of claim 21 wherein the operations further comprising generating a state end packet in response to determining that the additional state packets are not to be outputted into the packet log, wherein the state end packet provides an indication of end of the state packets in the packet log.

24. The non-transitory machine-readable storage medium of claim 23, wherein packet format and content of the event packets are same as the packet format and the content of the state packets for a specific state element, wherein the event packets are not associated with the boundary packet and the state end packet.

* * * * *